(12) United States Patent
Hanssen

(10) Patent No.: US 10,005,604 B2
(45) Date of Patent: Jun. 26, 2018

(54) CONTAINER FOR A PRESSURIZED BEVERAGE, IN PARTICULAR BEER, AND METHOD OF FILLING A CONTAINER WITH A PRESSURIZED BEVERAGE

(75) Inventor: Hubert Joseph Frans Hanssen, Amsterdam (NL)

(73) Assignee: EUROKEG B.V., Den Helder (NL)

( * ) Notice: Subject to any disclaimer, the term of this patent is extended or adjusted under 35 U.S.C. 154(b) by 37 days.

(21) Appl. No.: 13/375,498

(22) PCT Filed: Jun. 4, 2010

(86) PCT No.: PCT/EP2010/057861
§ 371 (c)(1),
(2), (4) Date: Jan. 19, 2012

(87) PCT Pub. No.: WO2010/139800
PCT Pub. Date: Dec. 9, 2010

(65) Prior Publication Data
US 2012/0121767 A1    May 17, 2012

(30) Foreign Application Priority Data
Jun. 5, 2009   (EP) .................................... 09162060

(51) Int. Cl.
*B29C 49/00*    (2006.01)
*B65D 85/72*    (2006.01)
(Continued)

(52) U.S. Cl.
CPC ............ *B65D 77/06* (2013.01); *B65B 31/006* (2013.01); *B67C 3/30* (2013.01); *B29C 49/00* (2013.01);
(Continued)

(58) Field of Classification Search
CPC .... B65D 83/625; B65D 83/663; B65D 77/06; B65D 83/14; B65D 83/62; B65D 88/62; B67D 1/045; B67D 1/0462
(Continued)

(56) References Cited

U.S. PATENT DOCUMENTS 3,317,089 A * 5/1967 Kopezynski ......... B67D 1/0412
                                                      220/23.87
3,477,610 A   11/1969 Hansen
(Continued)

FOREIGN PATENT DOCUMENTS

EP    0194871    9/1986
EP    0285761    10/1988
(Continued)

OTHER PUBLICATIONS

Communication pursuant to Article 94(3) EP, dated Jan. 5, 2012 in connection with European Patent Application No. 09162060.9.
(Continued)

*Primary Examiner* — Erik Kashnikow
*Assistant Examiner* — Lela S. Williams
(74) *Attorney, Agent, or Firm* — Steven M. Koehler; Westman, Champlin & Koehler, P.A.

(57) ABSTRACT

The invention relates to a container for a pressurized beverage, in particular beer, comprising a casing of a thermoplastic material, a valve part for dispensing the beverage from the container, and an expandable device holding a compressed gas or a gas generating system for expanding the device during or after filling the container to compensate for an increase in the volume of the container resulting from creep in the thermoplastic material.

21 Claims, 3 Drawing Sheets

(51) Int. Cl.
*B67D 7/06* (2010.01)
*B65D 77/06* (2006.01)
*B65B 31/00* (2006.01)
*B67C 3/30* (2006.01)
*B29K 67/00* (2006.01)
*B29K 667/00* (2006.01)
*B29L 31/00* (2006.01)

(52) U.S. Cl.
CPC ...... *B29K 2067/00* (2013.01); *B29K 2667/00* (2013.01); *B29L 2031/7158* (2013.01)

(58) Field of Classification Search
USPC ......... 426/115–116, 394, 106; 222/385, 389, 222/394, 386.5, 400.7, 400.8, 399, 402.1, 222/192
See application file for complete search history.

(56) References Cited

U.S. PATENT DOCUMENTS

| | | | |
|---|---|---|---|
| 3,610,455 A | 10/1971 | Greenhalgh | |
| 4,330,066 A | 5/1982 | Berliner | |
| 4,491,250 A | 1/1985 | Liebermann | |
| 4,518,103 A * | 5/1985 | Lim et al. | 222/135 |
| 4,781,645 A | 11/1988 | Kato | |
| 4,785,972 A * | 11/1988 | LeFevre | 222/1 |
| 4,805,799 A | 2/1989 | Robbins, III | |
| 4,867,348 A * | 9/1989 | Dorfman | 222/173 |
| 4,874,107 A | 10/1989 | Arnau-Munoz | |
| 4,919,310 A * | 4/1990 | Young et al. | 222/386.5 |
| 4,919,319 A | 4/1990 | Young et al. | |
| 4,923,095 A * | 5/1990 | Dorfman et al. | 222/386.5 |
| 4,984,713 A | 1/1991 | Chambers | |
| 5,135,137 A | 8/1992 | Rudick | |
| 5,333,763 A | 8/1994 | Lane et al. | |
| RE35,540 E | 6/1997 | Davies | |
| 5,769,282 A * | 6/1998 | Lane et al. | 222/386.5 |
| 6,000,549 A | 12/1999 | Perkins | |
| 6,220,311 B1 | 4/2001 | Litto | |
| 6,247,614 B1 | 6/2001 | Whitney et al. | |
| 6,561,222 B1 | 5/2003 | Gessner | |
| 6,571,977 B2 | 6/2003 | Gancalez | |
| 7,308,991 B2 | 12/2007 | Alberg | |
| 7,763,171 B2 | 7/2010 | Beall | |
| 7,819,286 B2 | 10/2010 | Antheil | |
| 2001/0032583 A1 | 10/2001 | Kraus | |
| 2004/0050863 A1 | 3/2004 | Savage | |
| 2006/0049213 A1* | 3/2006 | Wheaton | 222/400.7 |
| 2007/0023438 A1 | 2/2007 | Kenneth, Jr. | |

FOREIGN PATENT DOCUMENTS

| | | |
|---|---|---|
| EP | 0389191 | 9/1990 |
| EP | 0626338 | 11/1994 |
| EP | 0862535 | 10/1999 |
| EP | 1736421 | 4/2009 |
| GB | 2340812 | 3/2000 |
| GB | 2453802 | 4/2009 |
| JP | 2003192031 | 7/2003 |
| WO | 9410065 | 5/1994 |
| WO | 9622929 | 8/1996 |
| WO | 0007902 | 2/2000 |
| WO | 0078665 | 12/2000 |
| WO | 2008000272 | 1/2008 |
| WO | 2008000574 | 1/2008 |

OTHER PUBLICATIONS

International Search Report, dated Aug. 12, 2010 in connection with International Patent Application No. PCT/E2010/057861.

* cited by examiner

CONTAINER FOR A PRESSURIZED BEVERAGE, IN PARTICULAR BEER, AND METHOD OF FILLING A CONTAINER WITH A PRESSURIZED BEVERAGE

PRIORITY CLAIM TO RELATED APPLICATIONS

This application is a national stage application under 35 U.S.C. § 371 of PCT/EP2010/057861, filed Jun. 4, 2010, published as WO 2010/139800 A1 on Dec. 9, 2010, and claiming priority to European Application No. 09162060.9, filed Jun. 5, 2009, which application and publication is incorporated herein by reference and made a part hereof in its entirety, and the benefit of priority of which is claimed herein.

The invention relates to a container for a pressurized beverage, in particular beer, comprising a casing of a thermoplastic material, a valve part for dispensing the beverage from the container, and an inlet for introducing a propellant for dispensing the beverage from the container.

WO 00/78665 relates to a beer container comprising an inner hollow shell (11) of blow moulded PET to hold beer, an outer hollow shell (12) of moulded high density polyethylene enclosing and supporting the inner shell and a spear structure (13) including a dispenser tube (14) extending from a bottom interior region of the inner shell (11) through to a dispensing outlet (16) at the top of the outer shell (12).

EP 389 191 relates to a container for transport, storage and dispensing of beverages, such as beer, comprising an outer container (12) of plastics such as PET, and an inner bag (20) of flexible material, such as layered polyethylene.

WO 2008/000574 relates to a container for fluids, in particular liquids, such as beer or water, comprising an outer casing, preferably spheroid and preferably made of a rigid material, a gas and/or liquid tight inner casing of a flexible material located inside the outer casing, a valve part for filling the container with a fluid, and at least one vent via which the inside of the outer casing communicates with the outside at least during filling. In an example, the outer casing was made by blow-moulding a polyester preform, such as a PET (polyethylene terephthalate) or PEN (polyethylene naphthalate) preform.

It is an object of the present invention to provide a plastic container suitable for nitrogenated beverages, in particular nitrogenated beer.

To this end, the container according to the present invention comprises an expandable device holding a compressed gas or a gas generating system for expanding the device during or after filling the container to compensate for an increase in the volume of the container resulting from creep in the thermoplastic material.

Plastic containers holding a pressurized beverage are likely to expand permanently under the influence of the internal pressure exerted by the pressurized beverage. Permanent deformation under the influence of stresses is known as "creep". Creep occurs as a result of long term exposure to levels of stress that are below the yield strength of the material and generally increases with temperature. When plastic containers holding beer are subjected to prolonged transport and storage, e.g. two months or more, and/or relatively high temperatures, e.g. 35° C., the plastic containers will permanently expand yielding a void that typically will be filled with carbon dioxide escaping from the beer. As carbon dioxide has a good solubility in water, a large amount of carbon dioxide can be and in practice is added to the beer. Thus, even if some carbon dioxide escapes, sufficient carbon dioxide will remain in the beer and the effect on taste or texture will be hardly noticeable. However, this is different for nitrogenated beer, i.e. beer to which nitrogen has been added. Nitrogen ($N_2$) has a poor solubility in water and thus a small amount of nitrogen is added to the beer. When the volume of the container increases permanently by only a small percentage, a large percentage of the nitrogen will escape from the beer and taste, texture, and dispensing behavior of the beer will deteriorate. With the invention, the expandable device will take up the increase in volume and prevent nitrogen from escaping or at least reduces the amount of nitrogen that escapes.

In one embodiment, the expandable device is or comprises a pouch holding the gas generating system. This system comprises e.g. a solid reactant or reactants, such as sodium bicarbonate or a mixture of sodium bicarbonate and citric acid, and a breakable capsule containing a liquid reactant or catalyst, such as an aqueous solution of citric acid or water, respectively. Examples of a capsule include a smaller pouch of a thermoplastic film filled with the liquid and a sponge or other absorbent material containing the liquid and encapsulated by a breakable material, such as a solid paraffin.

The invention further relates to a container holding a pressurized beverage, in particular beer, comprising a casing of a thermoplastic material and a valve part for dispensing the beverage from the container. The beverage contains at least 1.25 vol %/vol nitrogen and the container comprises an expandable device containing a compressed gas or a gas obtained by a gas generating system and adapted to compensate for an increase in the volume of the container resulting from creep in the thermoplastic material.

The invention also relates to a method of filling a container comprising a casing of a thermoplastic material, a gas and/or liquid tight inner casing of a flexible material located inside the casing, and a valve part, with a beverage containing at least 1.25 vol %/vol nitrogen comprising the steps of filling the inner casing with the beverage, and introducing, during or after filling the container with the beverage, a compressed gas or a gas generating system between the inner and outer casings to compensate for an increase in the volume of the container resulting from creep in the thermoplastic material. I.e., instead of including an expandable device, the space between the inner and outer casings is utilized to contain the compressed gas or a gas generating system.

In a further embodiment of the present invention the beverage contains at least 1.5 vol %/vol nitrogen, typically an amount in a range from 1.5 to 5 vol %/vol.

In general, it is preferred that the amount of gas or latent gas, i.e. gas to be generated by the gas generating system, relative to the volume of the container is selected such that at least at temperatures between 5 and 40° C. the pressure of the gas and thus the pressure in the container is in excess of the total equilibrium pressure of the gas or gas mixture, e.g. a mixture of carbon dioxide and nitrogen, in the beverage. The gas ensures that, despite an increase in volume of the container resulting from creep, the pressure in the container remains higher than the total equilibrium pressure of the gas mixture in the beverage and thus prevents the gas mixture from escaping or at least reduces the amount of gas mixture that escapes.

In an embodiment, the volume of the gas or, when a gas generating system is used, latent gas at atmospheric pressure is in a range from 1 to 20% of the volume of the container.

In an embodiment, the device contains a liquid buffer, preferably in an amount in a range from 0.1 to 5% of the volume of the container. The liquid, e.g. water, can be employed to influence the pressure in the pouch and provide additional compensation for reversible, i.e. thermal and elastic, expansion of the container. At lower temperatures, e.g. at 6° C., more gas, e.g. carbon dioxide, will dissolve in the liquid and the pressure in the pouch will be relatively low. At higher temperatures, e.g. at 37° C., more gas will escape from the liquid and the pressure in the pouch will be relatively high.

The reactants in the gas generating system can be selected from, e.g., acid anhydrite and/or an acid, preferably an organic acid, such as citric, lactic, ascorbic, tannic, acetic, malic, fumaric, gluconic, and/or succinic acid, and a carbonate, such as sodium bicarbonate, sodium carbonate and/or calcium carbonate, or a sulphite.

In a further embodiment of the present invention, the container comprises a gas and/or liquid tight inner casing of a flexible material, e.g. a bag, located inside the (outer) casing.

In this embodiment, the space between the inner and outer casings can function as an expandable device. During or after filling the container with the beverage, the compressed gas or gas generating system is to be introduced between the inner and outer casings and in principle no separate pouch is required.

In case a pouch is used and is located between the inner and outer casings, the risk of contamination of the beverage, for instance when the pouch would rupture, is reduced. Also, during filling, the expanding outer wall of the inner casing can be employed to trigger expansion of the compressed gas or the start of the gas generating chemical reaction.

U.S. Pat. No. 5,333,763 relates to a activation device, suited for use in combination with a dispensing container for flowable product, containing a trigger enclosure in communication with at least first and second components of an at least two-component gas generating system for pressurizing the container, the trigger enclosure housing the second component of the gas generating system.

GB 2 453 802 relates to a one-touch type self-inflatable tube comprising a tube body containing a solution pouch and a powder. The sealed solution pouch contains either a solution of a water-soluble organic acid in water when the powder comprises sodium bicarbonate, or contains a solution of sodium bicarbonate in water when the powder comprises water-soluble organic acid powder.

U.S. Pat. No. 4,781,645 relates to an inflatable bag comprising a small sack which is charged with sodium bicarbonate and accommodating a small externally breakable container filled with an acidic solution. The small sack is enveloped in an inflatable bag member which is made of a synthetic resin having no permeability to the gas which is generated as a reaction between the sodium bicarbonate and the acidic solution.

WO 2008/000272 relates to a system for chemical generation of a pressure, said system comprising a container, e.g. a keg, and at least one pressure chamber, in which system the pressure in the pressure chamber is generated by an equilibrium reaction between at least two reactants. The system finds use in all containers in which a pressure is needed in order to drive out the contents of the container.

Within the framework of the present invention "vol %/vol" is defined as the volume percentage free gas, i.e. gas at standard conditions (273.15 K and 1 atm), dissolved in the beverage divided by the volume of the beverage. 1 vol %/vol equals 0.01 vol/vol. At standard temperature and pressure (273.15 K and 1 atm, i.e. at a molar volume of 22.4 l), 1 vol %/vol equals $4.4643 \cdot 10^{-4}$ mol/l. For nitrogen, having a molecular mass of 28.1 vol %/vol equals 0.0125 g/l (12.5 ppm).

The invention will now be explained in more detail with reference to the drawings, which show a preferred embodiment of the present invention.

Figure 1:
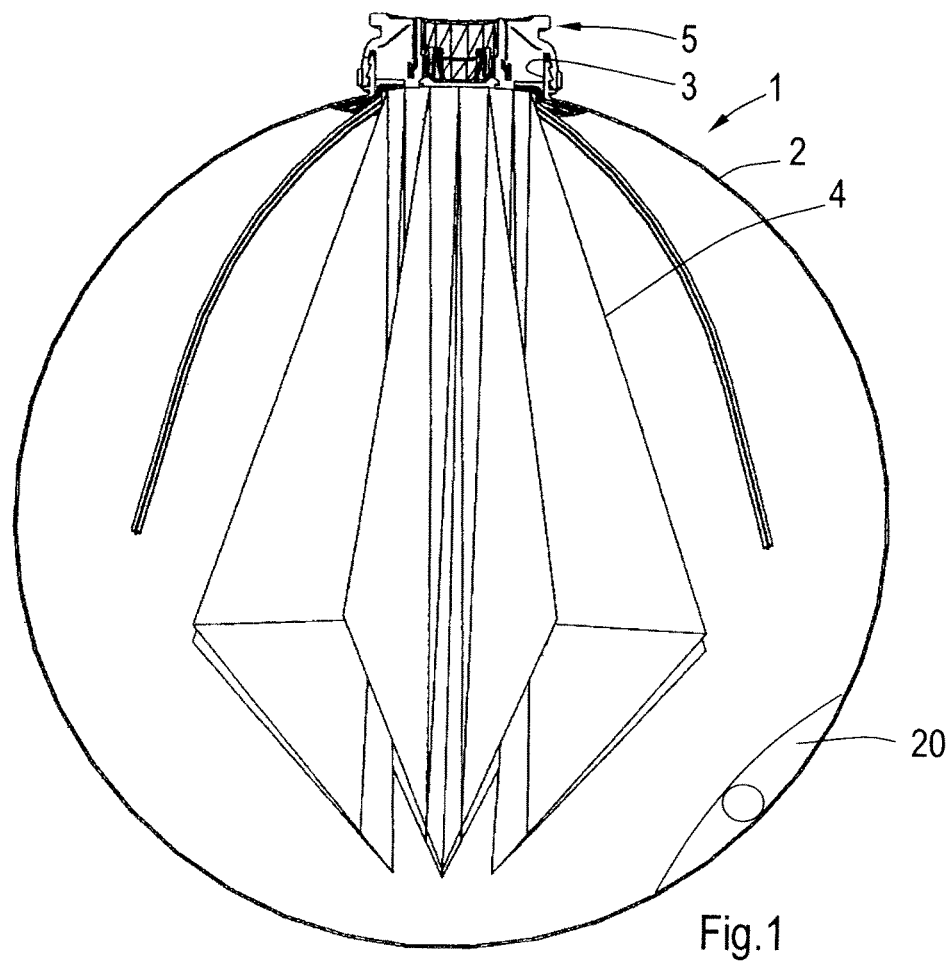
FIG. 1 is a cross-section through a container according to the present invention.

FIG. 1 shows a container 1 for a pressurized beverage, in particular a nitrogenated beer such as stout, comprising a spherical and pressure resistant outer casing 2 having a central opening 3, a gastight bag 4 of a flexible material located inside the outer casing 2, and a valve part 5, located in the central opening 3, for filling the container 1, more specifically the bag 4, with a liquid respectively dispensing beer from the container 1.

Figure 2:
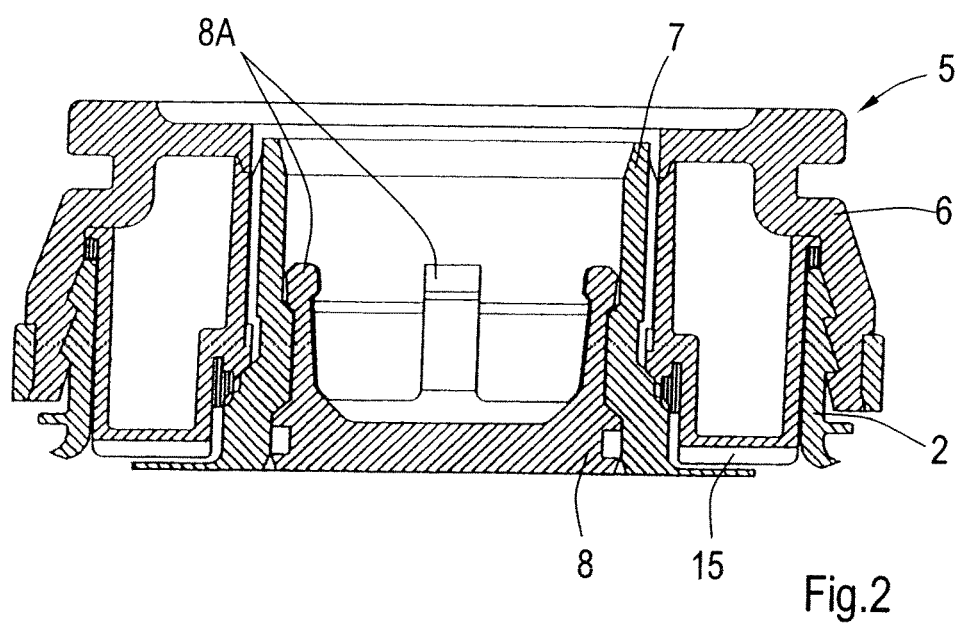
FIG. 2 is a cross-section of the valve part of the container in FIG. 1.
Figures 4A, 4B:
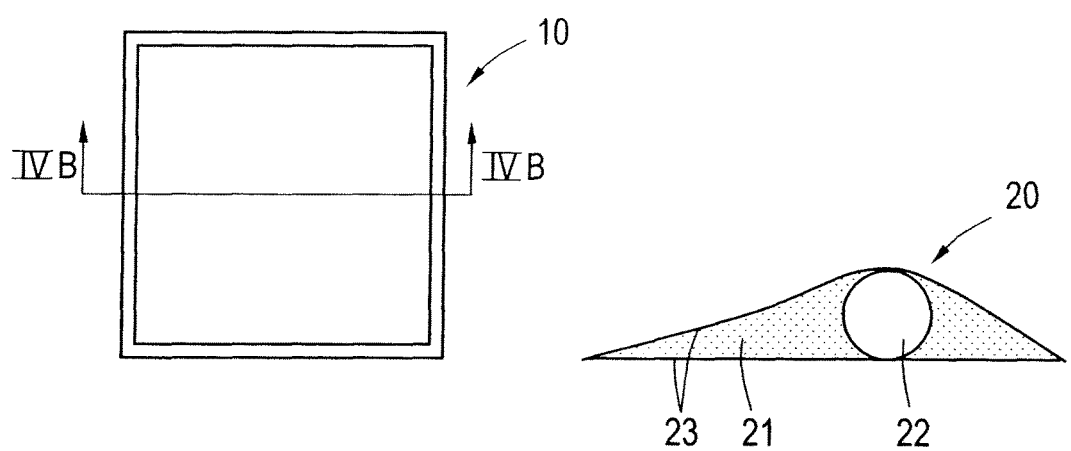
FIGS. 4A and 4B are a top view and a cross-section of a pouch for use in a container according to the present invention.

In this example, the outer casing 2 was made by blow-moulding a polyester preform, in particular a PET (polyethylene terephthalate) or PEN (polyethylene naphthalate) preform. The valve part 5, shown in more detail in FIG. 2, comprises an outer jacket 6 made of glass fiber reinforced PA or PP, an inner jacket 7 slidably received inside the outer jacket 6, and a closing element 8 which, in turn, is slidably received inside the inner jacket 7, and which comprises a plurality of resilient fingers 8A. The inner jacket 7 and the closing element are both made of a polyolefin such as PE or PP. A preferred valve part of this type is also disclosed in International patent application WO 00/07902 (see especially page 8, line 12 ff. in conjunction with FIGS. 4A and 4B), which is incorporated herein by reference.

Figures 3A, 3B:
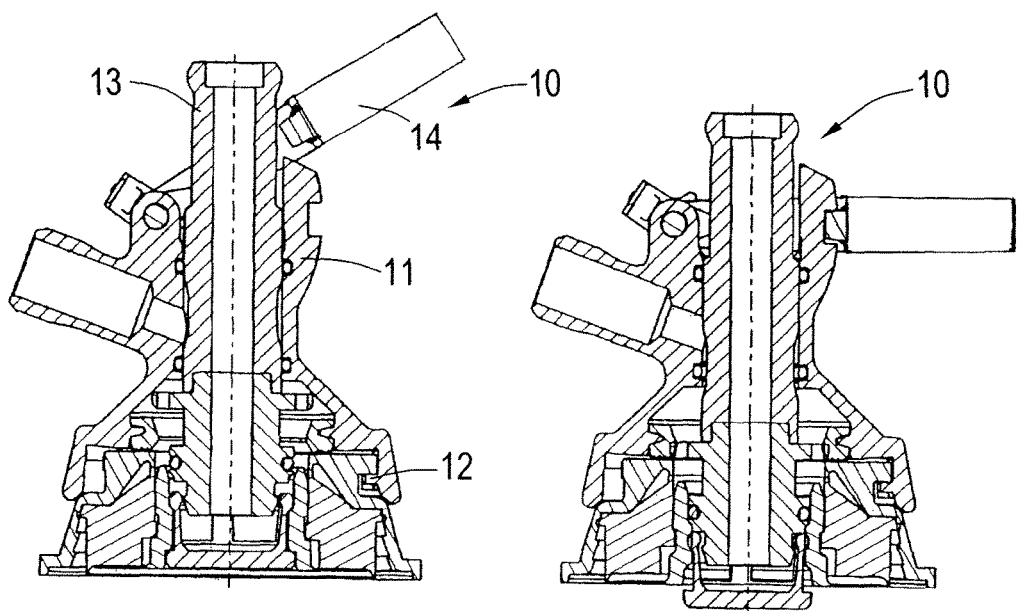
FIGS. 3A and 3B are cross-sections of a dispense head just prior to and after broaching of the container, respectively.

FIGS. 3A and 3B show a regular dispense head 10 comprising a housing 11, which can be coupled to the valve 5 by means of a bayonet fitting 12, a probe 13 consisting of two metal parts irreversibly press-fitted and glued together and slidably accommodated inside the housing 11, and a handle 14 for sliding the probe 13 inside the housing 11 just prior to broaching (FIG. 3A) and after broaching (FIG. 3B).

When, as shown in FIGS. 3A and 3B, the probe 13 of the dispense head 10 is pushed into the valve part 5, the inner jacket 7 slides with respect to the outer jacket 6 providing one or more vents 15 (shown in FIG. 2) for letting in propellant gas to expel liquid from the bag 4. Further, the closing element 8 slides with respect to the inner jacket 7 providing an opening for letting the liquid out.

The bag 4 comprises two, in this example polygonal, flexible sheets of a gas and liquid tight laminate, preferably a laminate comprising a sealing layer (e.g., PE or PP), a barrier layer (e.g. aluminum) and one or more further layers (e.g. PA and/or PET), sealed together along their edges, e.g. by means of welding.

In accordance with the present invention, the container comprises a pouch 20 holding a gas generating system, e.g. a mixture 21 of sodium bicarbonate and citric acid, and a breakable capsule 22 containing water. The pouch comprises a flexible tube or two flexible sheets 23 of a gas and liquid tight material, sealed together along their edges, e.g. by means of welding. The pouch is located between the bag and the casing, loose or e.g. adhered to the outer wall of the bag or the inner wall of the casing. During filling, the bag will expand and press the pouch against the inner wall of the casing, break the capsule and trigger the chemical reaction that generates the gas.

In this example, the spherical PET container has an internal volume of 20 or 30 liters, the maximum permanent increase of the internal volume resulting from creep during transport and storage is estimated at 270 or 400 ml, respectively, and the maximum pressure is estimated at 4.5 bar. To compensate for this increase in volume of 400 ml, the amount of carbon dioxide required is 3.3 liter (0.4 liter multiplied by the maximum absolute pressure, 5.5 bar, in the container). To generate 1 liter of carbon dioxide (at atmospheric pressure), in theory 3.2 g citric acid and 3.8 g of sodium bicarbonate are required.

To enable the chemical reaction and to regulate the pressure inside the pouch, the pouch contains 300 ml of water. At lower temperatures, e.g. at 6° C., more carbon dioxide will dissolve in the water and the pressure in the pouch will be relatively low. At higher temperatures, e.g. at 37° C., more carbon dioxide will escape from the water and the pressure in the pouch will be relatively high. However, as at higher temperature some carbon dioxide will remain dissolved an additional amount of gas has to be added or generated in the pouch. At 40° C. and 4.5 bar about 6 gram of carbon dioxide per liter of water will remain dissolved. When the pouch contains 300 ml of water, an additional 1.8 gram carbon dioxide should be present in the pouch.

Thus, in order to compensate the estimated maximum increase in volume of 400 ml and take account of 300 ml of water, about 10 g of citric acid and 12 g of sodium bicarbonate are required in the pouch and the pouch should have a maximum volume of at least 700 ml.

In general, it is preferred that the amount of gas or latent gas, i.e. gas to be generated by the gas generating system, relative to the volume of the container is selected such that at least at temperatures between 5 and 40° C. the pressure in the pouch and thus the pressure in the container is in excess of the total equilibrium pressure of the mixture of carbon dioxide and nitrogen in the beer. The gas in the pouch ensures that, despite an increase in volume of the container resulting from creep, the pressure in the container remains higher than the total equilibrium pressure of the mixture of carbon dioxide and nitrogen in the beer and thus prevents the mixture from escaping or at least reduces the amount of mixture that escapes.

Figure 5:
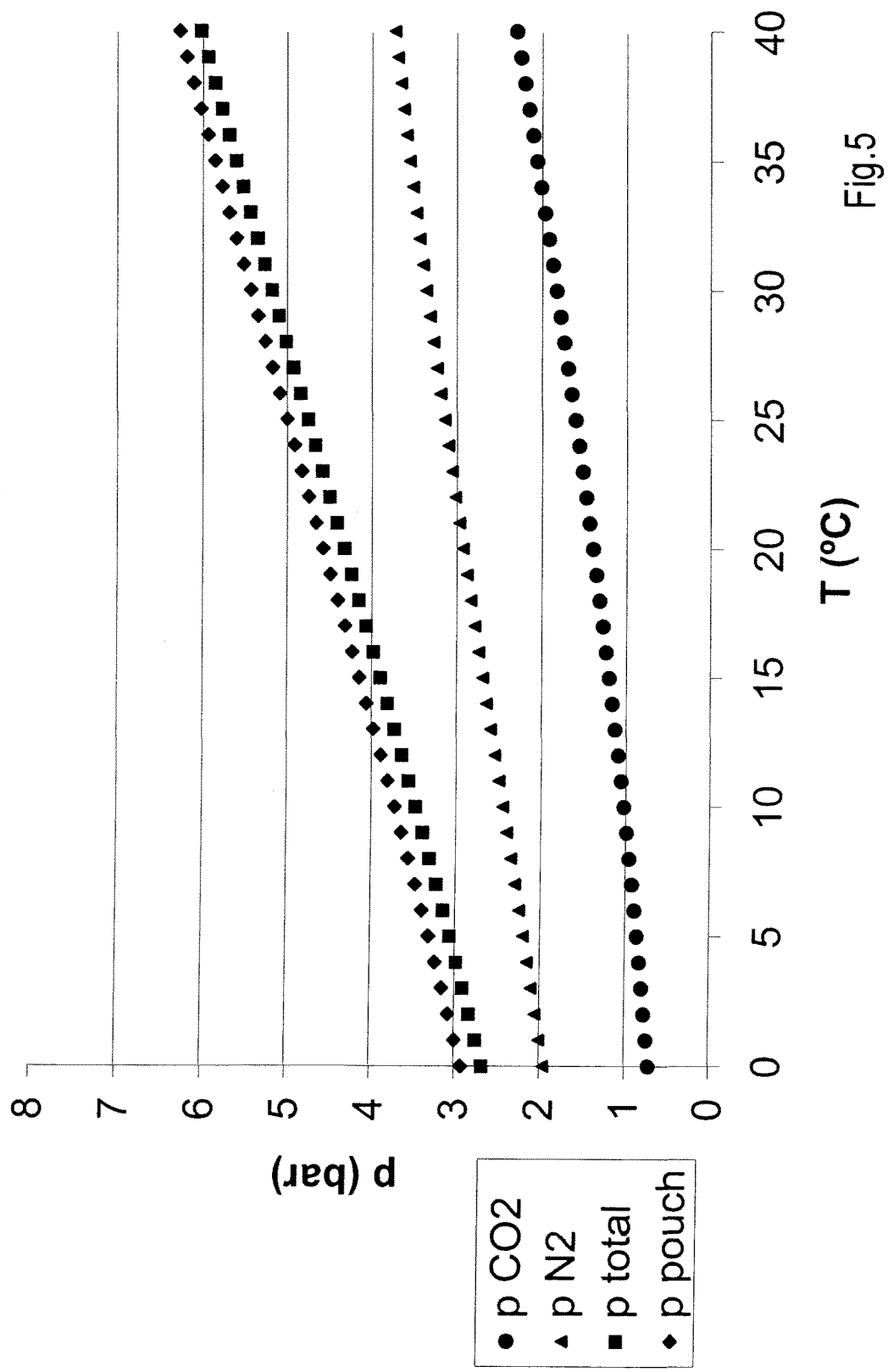
FIG. 5 is a graph showing the partial pressures of nitrogen and carbon dioxide.

This is illustrated in FIG. 5, which shows the partial pressures (●, ▲) and the total equilibrium pressure (■) of carbon dioxide and nitrogen in stout and the equilibrium pressure of the carbon dioxide in the pouch (♦) as a function of temperature. Within a range from 0° C. to 40° C., the equilibrium pressure of the carbon dioxide in the pouch and thus the pressure in the container is higher than the total equilibrium pressure of the carbon dioxide and nitrogen in the beer and the latter will experience no or little effect from a permanent increase in the volume of the container.

The invention is not restricted to the above-described embodiments which can be varied in a number of ways within the scope of the claims. For instance, an expandable device holding a compressed gas can be used instead.

The invention claimed is:

1. A container for a pressurized beverage, comprising a casing of a thermoplastic material, a valve part for dispensing the beverage from the container, and a propellant inlet for introducing a propellant into an inner space defined by the casing for dispensing the beverage from the container, wherein the container includes an expandable device disposed in the inner space and configured to hold a compressed gas or a gas generating system, the expandable device being separate from the valve part and separate from the propellant inlet, the device expandable during or after filling the container to compensate for an increase in the volume of the container resulting from creep in the thermoplastic material, wherein the gas after full expansion of the expansion device has a volume of at most 20% of the volume of the container.

2. The container according to claim 1, wherein the expandable device comprises a pouch holding the gas generating system.

3. The container according to claim 2, wherein the gas generating system comprises a solid reactant or reactants and a breakable capsule containing a liquid reactant or catalyst.

4. The container according to claim 1, holding a beverage that contains at least 1.25 vol %/vol nitrogen, and wherein the separate expandable device is configured to substantially maintain nitrogen in the beverage resulting from creep in the thermoplastic material.

5. The container according to claim 4, wherein the beverage contains at least 1.5 vol %/vol nitrogen.

6. The container according to claim 1, wherein an amount of gas or latent gas relative to the volume of the container is selected such that at temperatures between 5 and 40° C. the pressure of the gas or latent gas and thus the pressure in the container is in excess of the total equilibrium pressure of the gas or gas mixture in the beverage.

7. The container according to claim 6, wherein the volume of the gas or latent gas is in a range from 1 to 20% of the volume of the container.

8. The container of claim 7 wherein the volume in the range from 1 to 20% of the volume of the container is at atmospheric pressure.

9. The container according to claim 1, wherein the expandable device contains a liquid buffer.

10. The container according to claim 9, wherein the liquid buffer is in an amount in a range from 0.1 to 5% of the volume of the container.

11. The container according to claim 1, wherein the gas generating system comprises an acid anhydrite and/or an acid, and a carbonate or a sulphite.

12. The container according to claim 11, wherein the acid is an organic acid comprising at least one of citric, lactic, ascorbic, tannic, acetic, malic, fumaric, gluconic, and succinic acid.

13. The container according to claim 11, wherein the carbonate includes at least one of: sodium bicarbonate, sodium carbonate and calcium carbonate.

14. The container according to claim 1, and further comprising a gas and/or liquid tight inner casing of a flexible material located inside the casing, the inner casing configured to hold the beverage and to separate the beverage from an inner surface of the casing.

15. The container according to claim 1, wherein the casing has been made by blow-moulding a polyester preform, in particular a PET or PEN preform.

16. The container of claim 1, wherein the container is configured to hold a beverage that contains at least 1.25 vol %/vol nitrogen, and wherein the separate expandable device is configured to substantially maintain nitrogen in the beverage resulting from creep in the thermoplastic material.

17. The container of claim 16, wherein the beverage contains at least 1.5 vol %/vol nitrogen.

18. The container of claim 1 wherein the at most 20% of the volume of the container is at atmospheric pressure.

19. A container for a pressurized beverage, comprising a casing of a thermoplastic material, a valve part fluidly coupled to inside the casing, and an inlet separate from the valve part fluidly coupled to inside the container, and an expandable device disposed inside the casing, the expandable device being separate from the valve part, wherein the expandable device has a maximum expanded size of at most 20% of a volume defined by an inner surface of the casing within the inside of the casing.

20. The container of claim 19 wherein the at most 20% of the volume of the container is at atmospheric pressure.

21. A container for a pressurized beverage, comprising;

a casing of a thermoplastic material;

a gas and/or liquid tight inner casing of a flexible material located inside the casing, the inner casing configured to hold a beverage and to separate the beverage from an inner surface of the casing;

a valve part configured to dispense beverage from inside the inner casing;

an inlet configured to introduce fluid from outside the casing to a space in the casing between an outer surface of the flexible material of the gas and/or liquid tight inner casing and the inner surface of the casing; and an expandable device disposed between an outer surface of the flexible material of the gas and/or liquid tight inner casing and the inner surface of the casing, the expandable device configured to hold a compressed gas or a gas generating system fluidly isolated from the space in the casing between the outer surface of the flexible material of the gas and/or liquid tight inner casing and the inner surface of the casing, the expandable device being sealed and separate from the valve part and sealed and separate from the inlet.

* * * * *